(No Model.)
J. J. HOPPES.
FEED WATER HEATER AND PURIFIER.
No. 369,713. Patented Sept. 13, 1887.
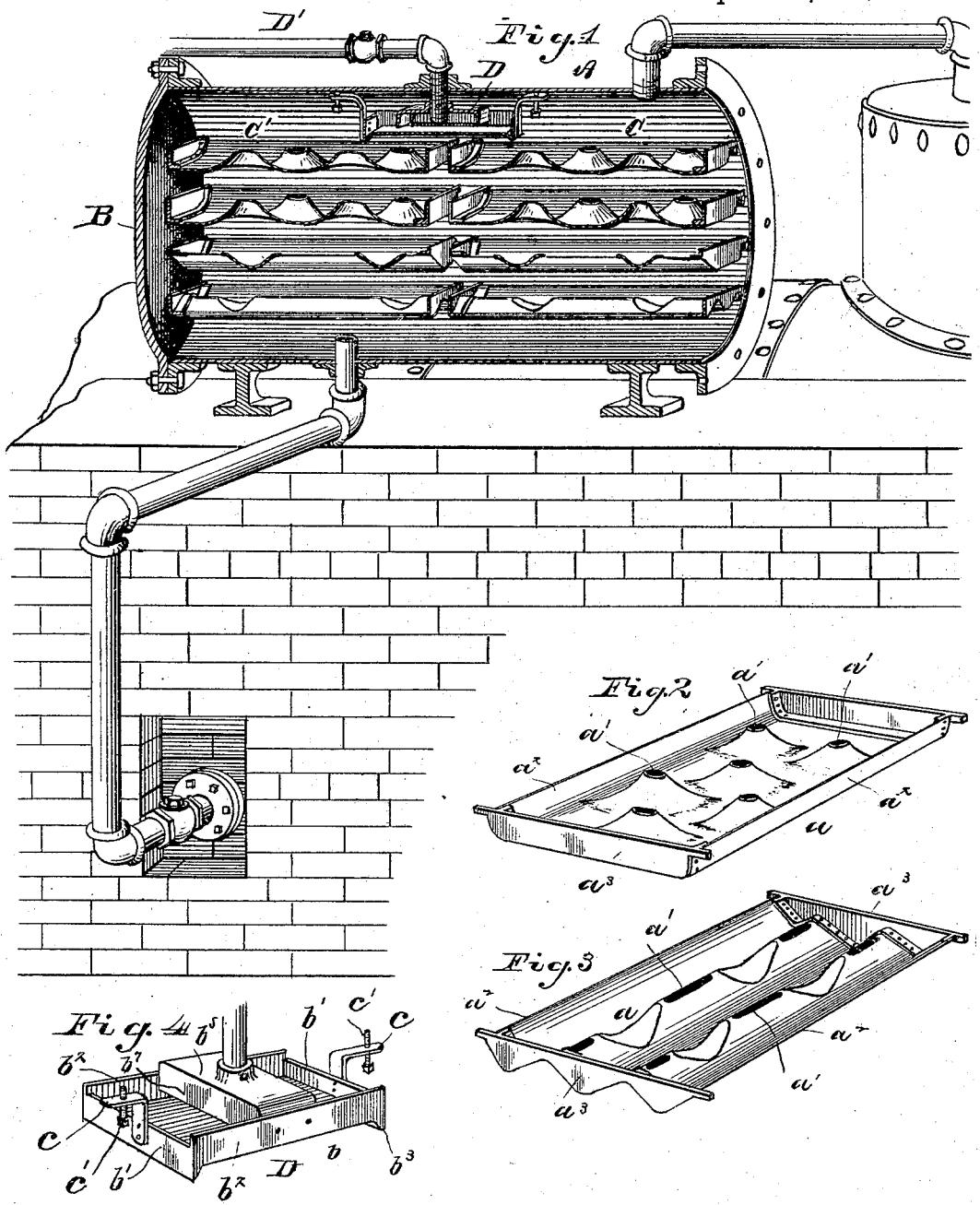
Witnesses
Inventor
John J. Hoppes

UNITED STATES PATENT OFFICE.

JOHN J. HOPPES, OF SPRINGFIELD, OHIO.

FEED-WATER HEATER AND PURIFIER.

SPECIFICATION forming part of Letters Patent No. 369,713, dated September 13, 1887.

Application filed December 16, 1886. Serial No. 221,797. (No model.)

*To all whom it may concern:*

Be it known that I, JOHN J. HOPPES, a citizen of the United States, residing at Springfield, in the county of Clark and State of Ohio, have invented certain new and useful Improvements in Feed-Water Heaters and Purifiers, of which the following is a specification.

My invention relates to heaters and lime extracters for heating and purifying the feed-water of steam-boilers. It also relates in its nature to improvements upon the heater shown and described in my Letters Patent No. 318,112, dated May 19, 1885.

My invention consists in a perforated plate or plates the openings in which are so formed that the water fed onto the said plate will pass through the said openings and follow the under side of said plate and deposit its incrustating substances thereon.

My invention further consists, in combination with the series of plates or pans, of a feed-box of a peculiar construction.

My invention further consists in various constructions and combinations of parts, hereinafter described, and pointed out in the claims.

In the accompanying drawings, which form part of this specification, Figure 1 is a perspective view, partly in section, showing the general arrangement of my improved heater and the method of connecting it to a steam-boiler. Figs. 2 and 3 are respectively perspective views showing the preferable construction of the pans or plates. Fig. 4 is a perspective view of the feed or overflow box from which the water is fed to the pans.

In the said drawings, A represents the outer casing, preferably provided at each end with removable heads B, (only one of said heads being shown in the drawings,) and having a series of longitudinal ways or slides on which the heating plates or pans are adapted to rest in such a manner that they may be readily removed therefrom, substantially as described and set forth in my patent above referred to of May 19, 1885.

In my present heater I preferably provide two series of plates or pans, C and C', over which the water is adapted to pass. These pans C, I preferably construct from a single plate, $a$, of sheet-steel or other suitable material. The steel is preferably used, as the resilience will cause the lime and other incrustations to readily scale therefrom when the pans are removed for cleaning. Each of the pans or plates is provided with a series of perforations, $a'$, in the bottom thereof, the sides of which perforations are raised and inclined outwardly. The plates $a$ are each turned upwardly on each side to form retaining-edges $a^2$, and are secured at either end to end pieces, $a^3$. The sides $a^2$ and the end pieces, $a^3$, stand above the openings in the bottom of the plates, so that the water which falls thereon passes through the said openings and follows the under side of the plates or pans, thus covering the entire under surface thereof and dropping off at various points between the said openings into the pans below.

As above stated, I preferably arrange the pans or plates in two series which come together at or near the middle of the outer casing, A. In order that the water fed to the heater may be discharged evenly into the respective pans, I provide an overflow or feed-box, D, at the end of the inlet-pipe D'. The outer portion of this overflow-box D consists, preferably, of a rectangular pan, $b$, the ends $b'$ of which are lower than the side pieces, $b^2$, said end pieces, $b'$, being also projected below the bottom of the said pan, forming ledges or flanges $b^3$ at each end of the said pan.

Extending across the pan $b'$, at or near the center, is a small box or receiver, $b^5$, which is placed in the outer pan, $b$, in an inverted position and rigidly secured therein by riveting or any other suitable manner. The inlet-pipe D' passes through the top of the box or receiver $b^5$ and extends therein to a point below the upper edges of the end pieces of the outer box or pan. The sides $b^7$ of the inverted box $b^5$ project into the outer box or pan below the end of the inlet-pipe D'. The overflow-box D thus formed is preferably secured on the end of the inlet-pipe D' in such a manner that it may be adjusted therein, and is provided at either end with extending arms $c$, having adjusting-screws $c'$, adapted to bear against the top of the outer casing, A, and thus furnish means for adjusting the box D to a horizontal position.

The water from the inlet-pipe D' enters the feed-box D through the top of the receiver or inner box, $b^5$, and fills the outer pan or box until the water begins to flow over the end pieces, $b'$. The end of the inlet-pipe stands below the water-line, and the sides $b^7$ of the inner box or receiver stand below the end of the said inlet-pipe. The water is thus divided and flows over the respective ends of the outer pan, $b'$, and falls on the respective series of pans below. By this construction it will be seen that the water is divided evenly between the respective series of plates.

The extended sides of the inverted box $b^5$ form brakes between the end of the inlet-pipe and the overflow-edges, which prevent the bubbling and boiling of the water and at the same time prevent the water from running to one end of the box only, in case the said box should be accidentally placed out of a horizontal or level position.

The projecting ledges or flanges $b^3$ on the end of the outer pan cause the water to drop directly therefrom and prevent its running along the under surface of the overflow-box, thus furnishing means by which all the water is discharged onto the respective series of plates or pans, and by which it is prevented from falling between the same.

It is obvious that the plates or pans may be variously modified. In Fig. 1, I have shown two forms of pans, in one of which the perforations are round and provided with cone-shaped sides. In the other the perforations are of an oblong shape and placed in the top of corrugations, which are provided at intervals with cross depressions or corrugations, as shown in Fig. 3. In either case the water passing through the openings therein will follow the inclined sides and spread over the under surface of the pans, on which the incrustating substances will be deposited by the action of the steam thereon, supplied to the heater in any well-known way. It is obvious that various other forms of perforations may be used. If desired, simple corrugations extending longitudinally or transversely across the pan, and provided with longitudinal openings in the top thereof, may be used.

Instead of having the sides $a^2$ of the plates extended above the openings in the bottom thereof, they may be formed of an equal height with said openings, so that the water will flow over the sides as well as through the said openings, in the manner substantially set forth in the patent of May 19, above referred to.

In the drawings I have shown the heater connected to a stationary boiler, in the manner generally adopted. It is obvious, however, that it may be connected in any well-known or suitable manner. It is evident that it also may be connected to the exhaust-pipe of an engine and used as an exhaust-steam heater instead of a live-steam heater. Various other modifications may be employed in the construction and the arrangement of the parts, and I do not therefore limit myself to the constructions and arrangements herein described and set forth.

In the drawings I have shown the heater placed horizontally, with the plates or pans running longitudinally through the same. It is evident, however, that it may be used vertically, if desired, and the plates or pans arranged transversely therein. The outer shell or casing may be of any form or shape desired and the plates or pans modified to suit the same.

I claim—

1. In a feed-water heater, a perforated pan or plate the openings in which are so formed that the water will flow through the same and follow the under side of said pan or plate, substantially as set forth.

2. The combination, with the outer casing, of a series of pans or plates each of which is provided with a series of openings through which the water is adapted to flow, said openings being so constructed that the water which flows through the same will follow the under side of said pan or plate, substantially as and for the purpose set forth.

3. The combination, in a feed-water heater, of overflow pans or plates arranged in two series therein, an overflow-box adapted to distribute the water evenly to the respective series, and means for adjusting said overflow-box, substantially as set forth.

4. The combination, in a feed-water heater, with the overflow-pans arranged in a double series therein, of the overflow-box secured to the inlet-pipe, said overflow-box being provided with depressions at the ends thereof over which the water is adapted to flow, and downwardly-projecting flanges between the overflow-pipe and said depressions, substantially as set forth.

5. The combination, with the overflow-pans arranged in two series, of the inlet-pipe adapted to conduct the water thereto, an overflow-box at the end of said inlet-pipe, said overflow-box being composed of an outer pan provided with depressed ends, and an inner inverted box or receiver into which the water is adapted to be discharged, substantially as and for the purpose set forth.

6. In a feed-water heater, an overflow plate or pan formed from a single piece of metal bent up at the sides and provided with end pieces, said plate or pan being provided with cone-shaped elevations therein having openings in the top thereof through which the water is adapted to flow and follow the under surface of the pan, substantially as set forth.

7. In a feed-water heater, the combination, with a series of pans, of a feed-box having depressed ends over which the water is adapted to flow and projecting ledges on the bottom of the said box to prevent the water from flowing along the bottom thereof, substantially as and for the purpose set forth.

In testimony whereof I have hereunto set my hand this 10th day of December, A.D. 1886.

JOHN J. HOPPES.

Witnesses:
CHASE STEWART,
PAUL A. STALEY.